(12) United States Patent
Genest (10) Patent No.: US 11,851,241 B2
(45) Date of Patent: Dec. 26, 2023

(54) HOLDER DEVICE

(71) Applicant: Christopher Genest, Kennebunkport, ME (US)

(72) Inventor: Christopher Genest, Kennebunkport, ME (US)

(*) Notice: Subject to any disclaimer, the term of this patent is extended or adjusted under 35 U.S.C. 154(b) by 0 days.

(21) Appl. No.: 17/734,397

(22) Filed: May 2, 2022

(65) Prior Publication Data

US 2023/0028027 A1    Jan. 26, 2023

Related U.S. Application Data

(60) Provisional application No. 63/176,912, filed on Apr. 20, 2021.

(51) Int. Cl.
*F16M 13/02* (2006.01)
*B65D 25/20* (2006.01)
*B65D 83/38* (2006.01)

(52) U.S. Cl.
CPC ............ *B65D 25/20* (2013.01); *B65D 83/38* (2013.01); *F16M 13/02* (2013.01)

(58) Field of Classification Search
CPC ...... B65D 25/20; B65D 83/38; B65D 83/388; B65D 83/207; F16M 13/02; B05B 15/62
See application file for complete search history.

(56) References Cited

U.S. PATENT DOCUMENTS

| | | | | |
|---|---|---|---|---|
| 4,040,543 A | * | 8/1977 | Guillen | B65D 83/202 222/402.15 |
| 5,060,899 A | * | 10/1991 | Lorence | B60N 3/108 297/188.17 |
| D626,366 S | * | 11/2010 | Schmidt | D6/545 |
| 2004/0108337 A1 | * | 6/2004 | Makino | A47K 5/12 222/183 |
| 2008/0217495 A1 | * | 9/2008 | Roepke | A47K 17/00 248/223.41 |
| 2010/0122993 A1 | * | 5/2010 | Tenbrink | B05B 15/62 222/321.9 |
| 2016/0288151 A1 | * | 10/2016 | Schultz | A47K 5/1204 |

* cited by examiner

*Primary Examiner* — Terrell L McKinnon
*Assistant Examiner* — Jerry Olivier (57) ABSTRACT

A holder for a canister that secures the canister in a fixed upright position and that has a securing arm that fits around common construction related objects so that the holder and canister may hand from a such construction objects.

6 Claims, 9 Drawing Sheets

HOLDER DEVICE

BACKGROUND INFORMATION

Field of the Invention

The invention relates to devices that hold objects, and in particular devices that hold cylindrical shaped canisters and containers.

Discussion of Prior Art

Spray canisters and containers are devices that hold some type of formula that is dispensed on demand through some form of applicator nozzle. The potential uses and applications for such canisters are extensive, but one common use is in the construction industry. In particular, canisters that spray insulating foams, adhesives, and sealants are used extensively.

These types of canisters tend to be relatively heavy-duty canisters, compared to those that might be more common for conventional household use, and often use heavy dispensing guns that are removably attached to the top of the canister. The weight of these dispensing guns tends to make the entire device top heavy, particularly as the contents of the canister start to get low. As a result, the canisters fall over easily. This causes a number of problems. In some instances, the dispensing guns break and need to be replaced. In other instances, the canisters simply fall from the work area and force the workers to leave the work area to retrieve the canister.

What is needed, therefore, is a device that securely holds the canister on a job site.

BRIEF SUMMARY OF THE INVENTION

The invention is a holder for a canister that secures the canister in a fixed upright position and that has an outer securing arm that fits around common construction related objects such as over the sides of boards and the sides of masonry blocks.

The holder has a base that includes a number of tabs that snap against the base of the canister, and/or around a lower lip on the canister, so as to provide a firm hold on the canister. There is also an upper containment area that secures a higher portion of the canister and prevents the canister from tipping over to one side.

The outer securing arm extends out and away from the base and has a section that extends downward at a roughly 90 degree angle, the outer securing arm serving as both a handle and a hook. A backside of the holder has a slight angle such that the handle and spine secure to the side of an object such as a wooden board or masonry block while maintaining an upright posture of the canister and being easily removable from the object.

The area between the base and the upper securing arm is largely open, except for the spine, and as a result users may use the canister while it is in position in the holder.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-9 illustrate the holder device 100 according to the invention, including a lower securing member that is a securing base 10, the securing base connected to a connecting member that is a spine 30, and the spine 30 connected to an upper securing member in the form of an upper securing arm 50 and an outer securing arm 70.

Figure 1:
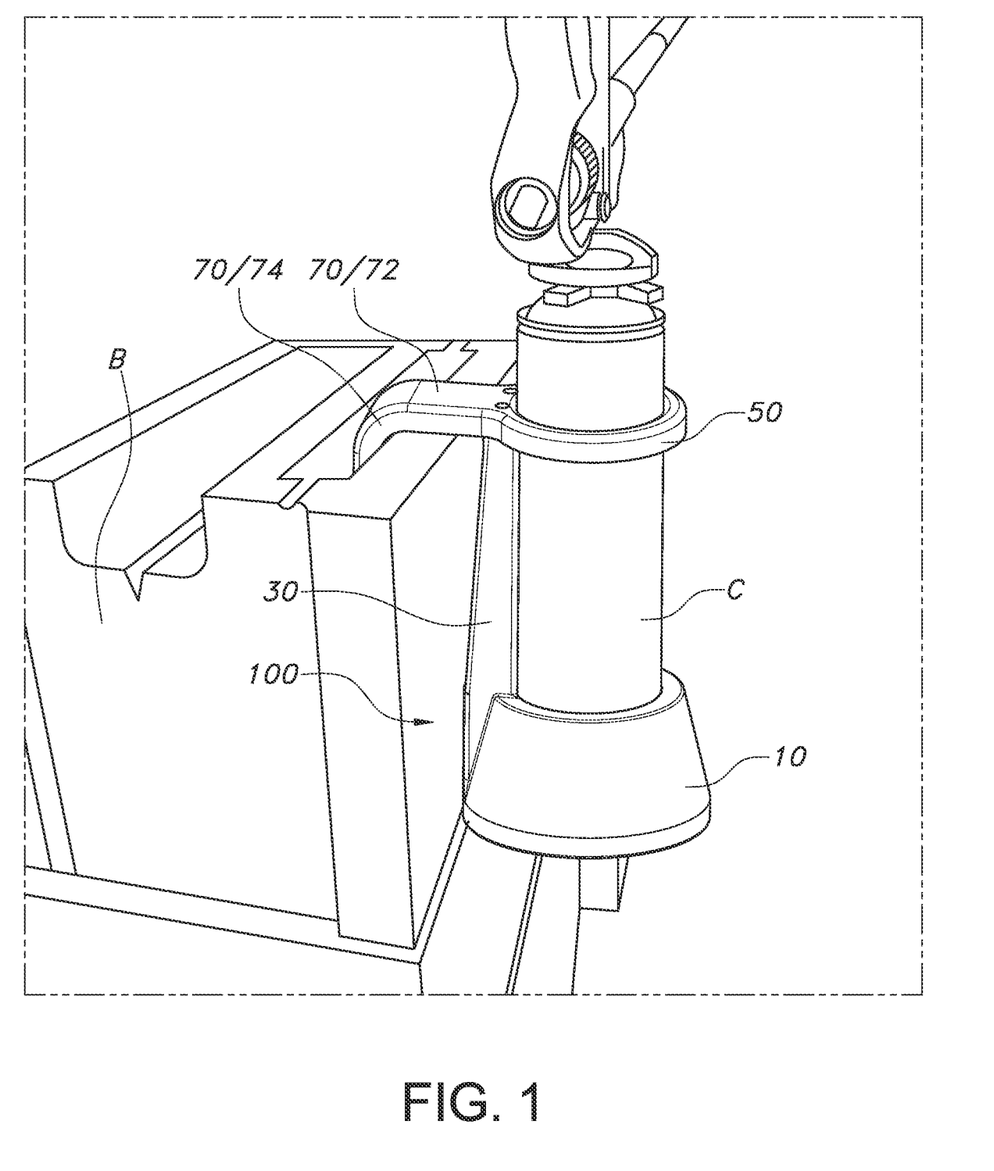
FIG. 1 is a side view of the device according to the invention, holding a spray foam canister and using the hook to hang from a portion of a masonry block wall.
Figure 2:
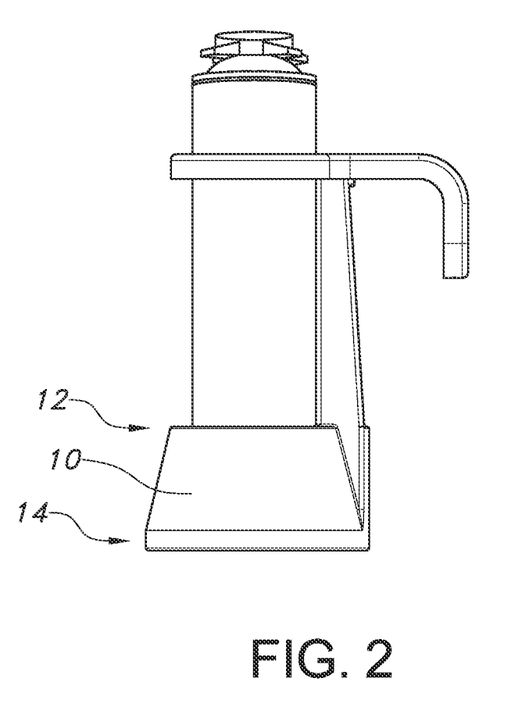
FIG. 2 is a side view of the device holding a canister.
Figure 3:
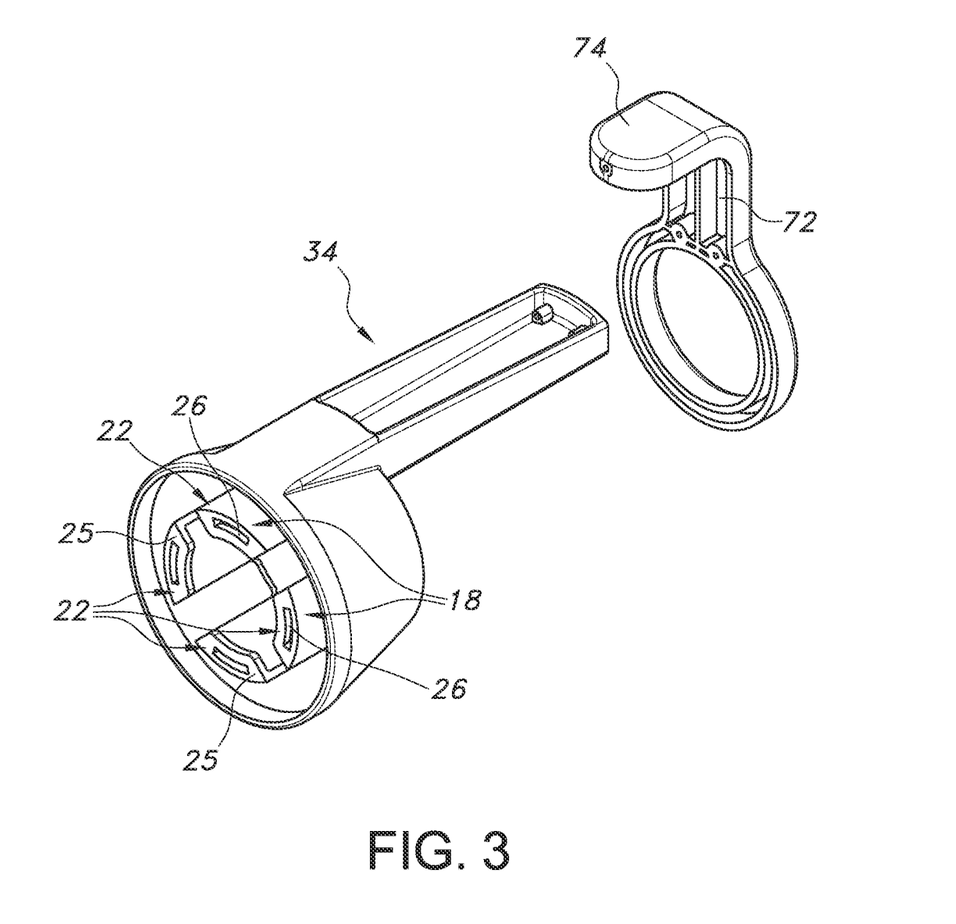
FIG. 3 is a perspective view of the holder in two parts showing the bottom, side, and back of the device.
Figure 4:
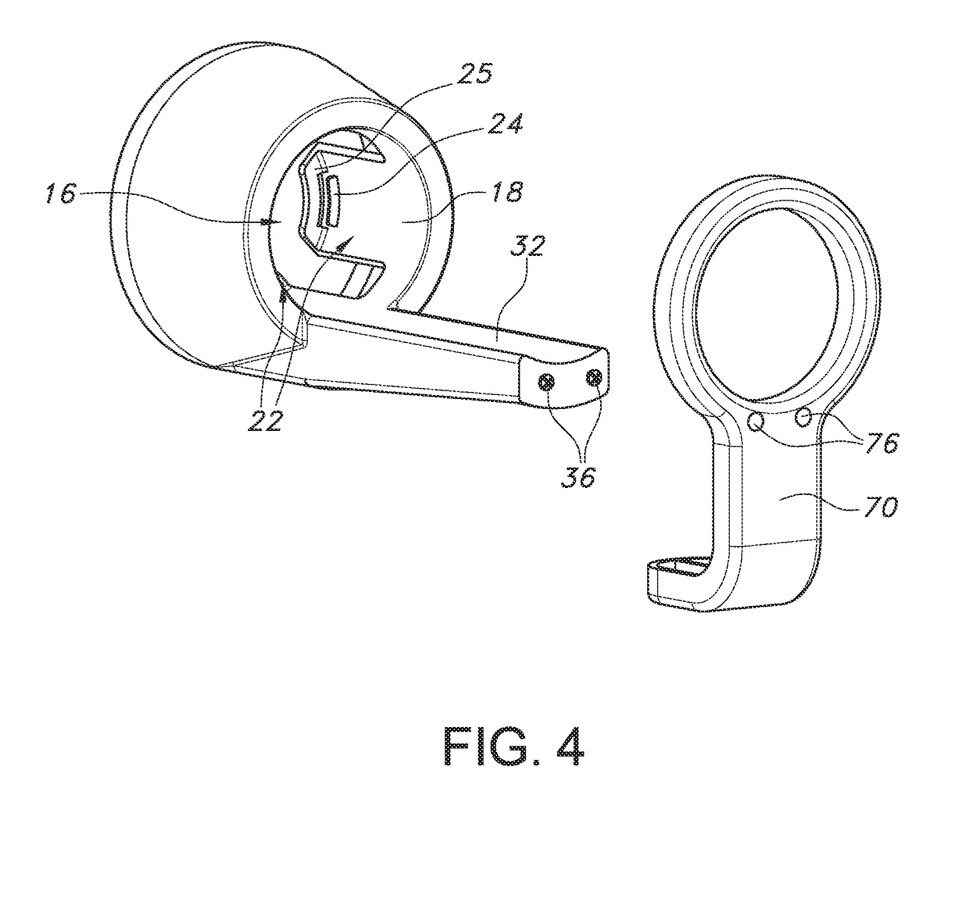
FIG. 4 is a perspective view of the holder in two parts showing the top, side, and front of the device.
Figure 5:
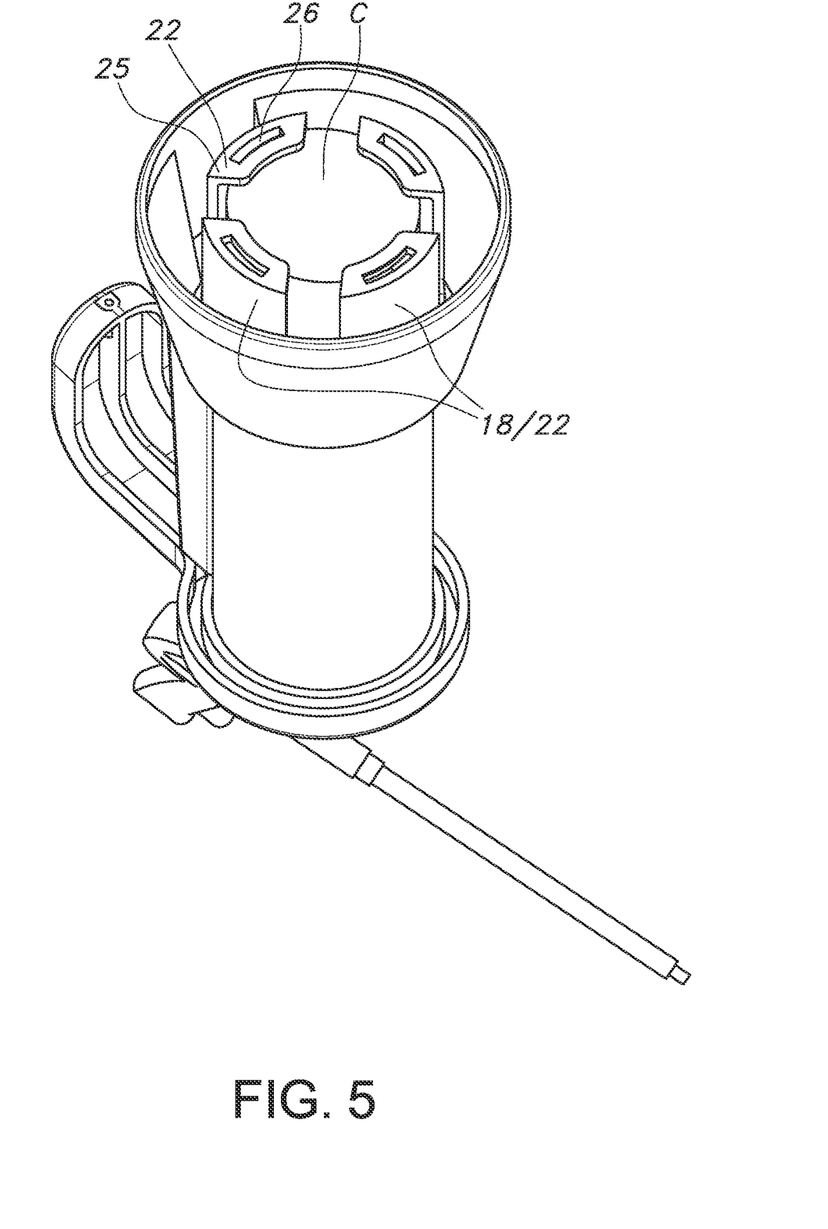
FIG. 5 is a perspective view of the device holding a canister.
Figure 6:
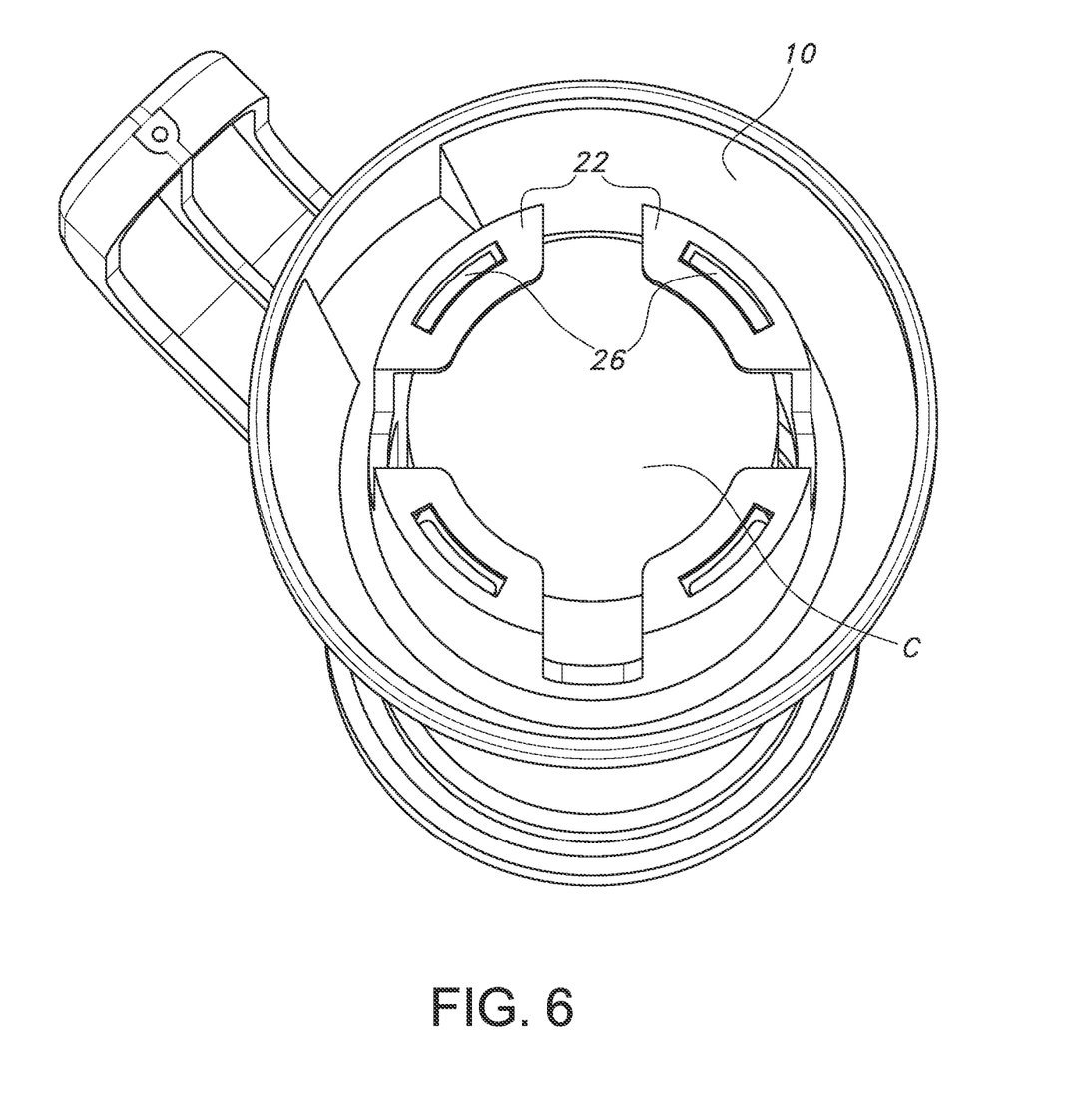
FIG. 6 is a detailed view of the bottom of the device holding a canister.
Figure 7:
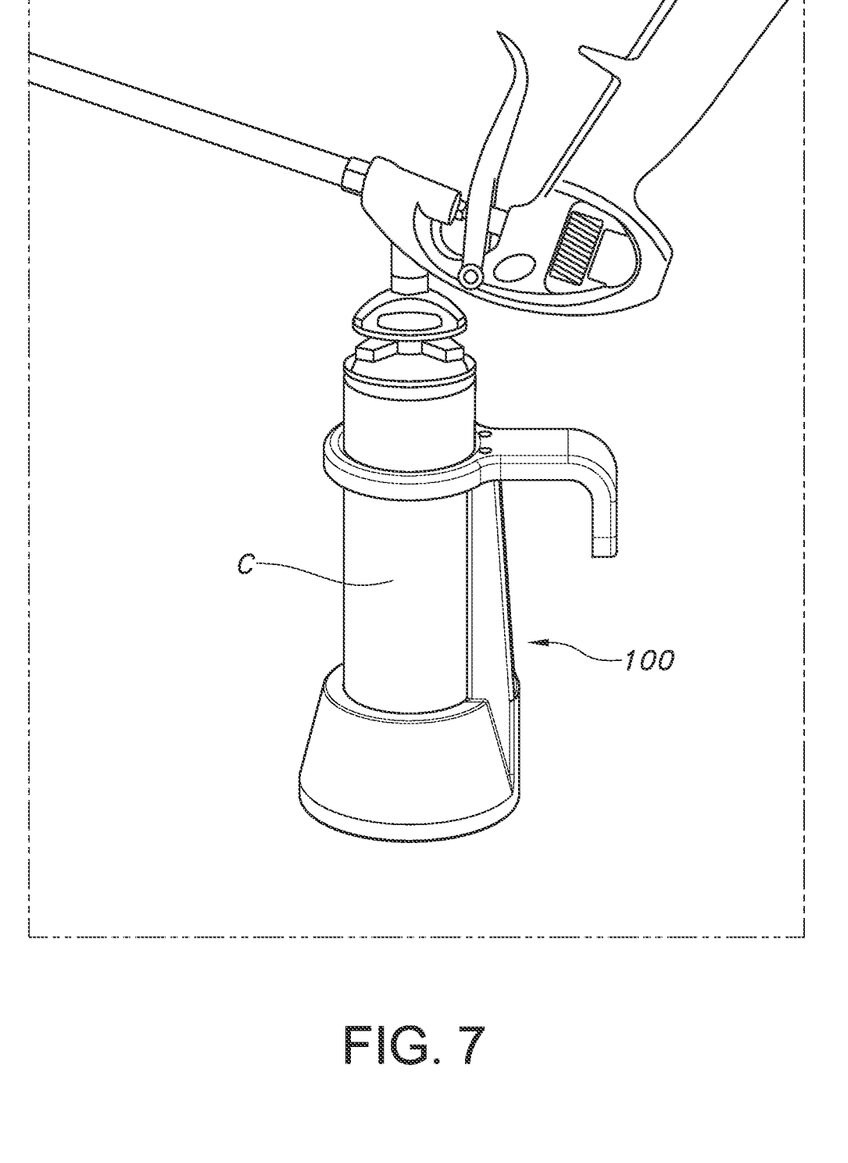
FIG. 7 is a side view of the device holding a canister and sitting on the top of a masonry block wall.
Figure 8:
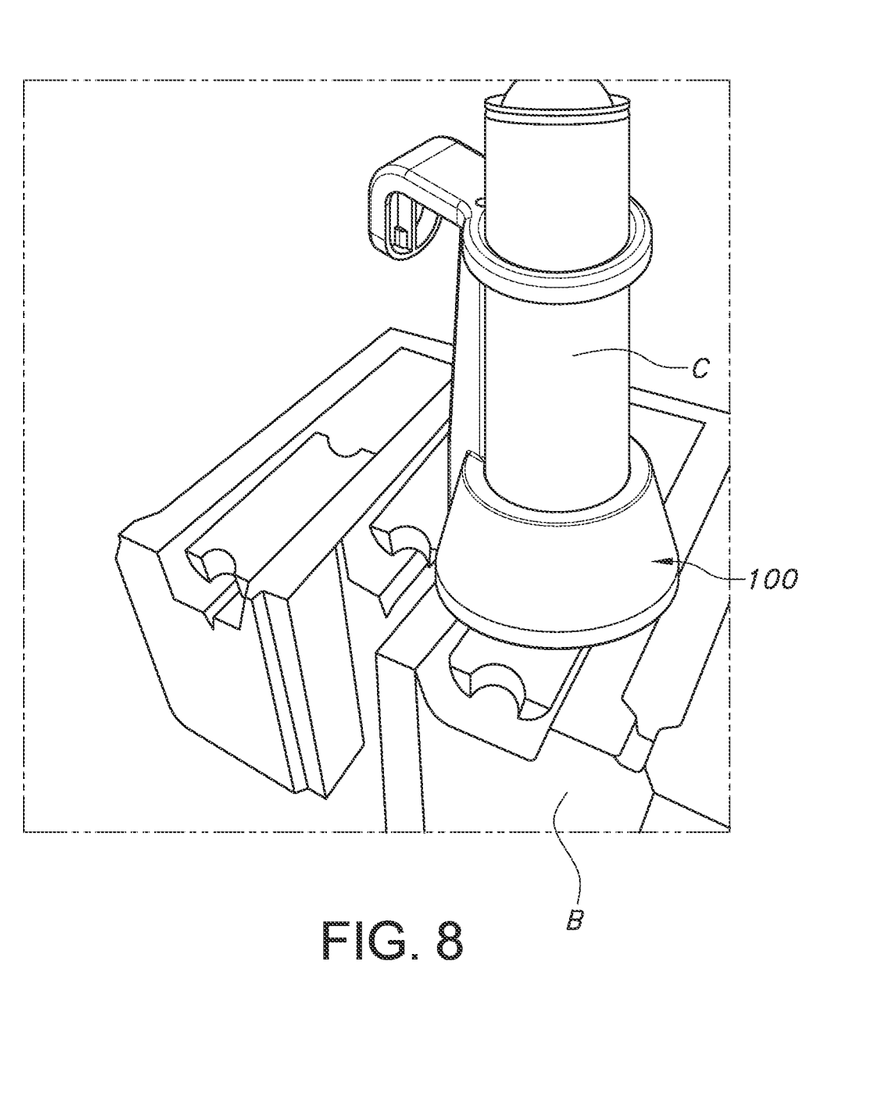
FIG. 8 is a front perspective view of the device holding a canister.
Figures 9A, 9B, 9C, 9D, 9E, 9F:
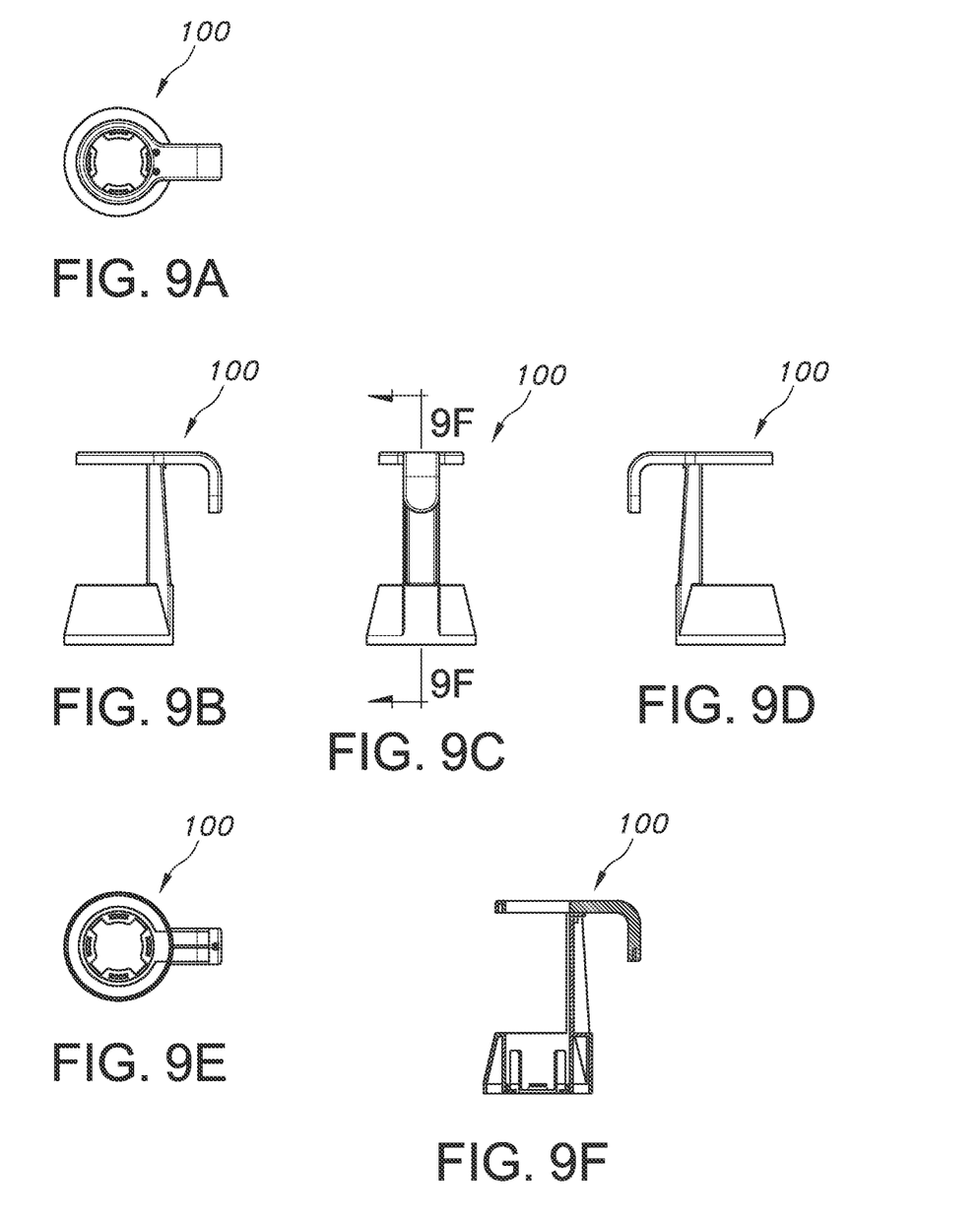
FIG. 9a is a top view of the device.
FIG. 9b is a left side view of the device.
FIG. 9c is a front view of the device.
FIG. 9d is a right side view of the device.
FIG. 9e is a bottom view of the device.
FIG. 9f is a cross-sectional side view of the device.

The securing base 10 has an outer surface that is wider at a lower section 12 and narrower at a top section 14. The base 10 also has an open middle area 16 to accept a bottom portion of the canister C. The open area 16 is largely circular in shape to match the conventional canister, however it may also be shaped in other configurations to hold differently shaped devices. An inner portion 18 of the lower section 12 has one or more securing tabs 22 that extend inward towards the open area and are configured to secure a bottom portion of the canister. As best shown in FIGS. 3-5 each tab 22 is tapered inward and has an upper lip or protrusion 24 and a lower lip or protrusion 25, each generally extending inward towards the open area 16. The lower lip 25 includes an opening 26. In use, a lower ridge of the conventional canister c fits into the opening 26 and securely presses between the upper 24 and lower 25 lips such that the canister is firmly held in position. Each tab 22 and the respective components are substantially rigid components that are firm enough secure the canister C in place but are also slightly bendable such that a user may use their hands to pull the tab 22 slightly off of and away from the canister C so as to help remove/free the canister from the holder 100. For example, the holder device, including the tabs, may be made of polypropylene in order for the tabs to have sufficient rigidity and bendability.

The spine 30 connects the base 10 to the upper securing arm 50 and the outer securing arm 70. The spine 30 has a front surface 32 that has a slight curvature to generally match the curved shape of a conventional canister C. The spine 30 has a back side 34 that is tapered slightly inward from bottom to top so as to allow the bottom portion to secure against the side of an object, such as a masonry block or a board, while allowing the upper portion to be easily attached to or removed from the object.

The upper securing arm 50 is in the form of a ring through which the canister may be inserted, however, other configurations are also practical. For example, there could be two arms that extend on either side of the canister but do not form a complete ring.

The outer securing arm 70 has an arm 72 that extends outward in a generally straight line and a hook 74 that extends downward. The opening between the hook 74 and the back side 34 of the spine 30 is generally sized and shaped to fit over common construction objects such as boards and masonry blocks B.

FIGS. 3 and 4 illustrate an embodiment of the device that includes two sections, an upper section that includes the upper securing arm and lower securing arm, and a lower section that includes the spine and the base. The upper and lower sections are secured together by conventional fasteners such as screws, and may be configured with openings 76, 36 to easily facilitate the use of such fasteners.

It is understood that the embodiments described herein are merely illustrative of the present invention. Variations in the construction of the holder may be contemplated by one skilled in the art without limiting the intended scope of the invention herein disclosed and as defined by the following claims.

What is claimed is:

1. A device adapted to hold a canister, the device comprising:
   a lower securing member and an upper securing member, the lower securing member and the upper securing member connected to one another by a connecting member;
   the lower securing member having an upper end and a lower end, the upper end having an opening and configured to fit around a base of the canister, the lower end configured to secure the base in the lower securing member;
   the lower securing member further including one or more securing tabs that are configured to secure the base of the canister in the lower securing member, the one or more securing tabs further including an upper lip and a lower lip, the upper lip and lower lip configured to secure a ridge on the base of the canister, the lower lip including an opening that is configured to further secure the ridge;
   the upper securing member configured to secure an upper portion of the canister.

2. The device of claim 1, the upper securing member including an upper securing arm that is configured to fit around at least a majority of the canister.

3. The device of claim 2, wherein the upper securing arm is a ring that is configured to fit around the canister.

4. The device of claim 3, the upper securing member further including an outer securing arm that extends outward in a direction opposite that of the upper securing arm.

5. The device of claim 4, the outer securing arm configured to fit on a masonry block.

6. The device of claim 1, the connecting member having an inner face that is curved to match a curvature of the canister.

* * * * *